US006084188A

United States Patent [19]

Mueller et al.

[11] Patent Number: 6,084,188

[45] Date of Patent: Jul. 4, 2000

[54] CIRCUIT INTERRUPTER WITH NON-SYMMETRICAL TERMINAL COLLAR

[75] Inventors: Robert W. Mueller, Aliquippa; Thomas A. Whitaker; Wayne C. Sumpman, both of North Huntingdon, all of Pa.

[73] Assignee: Eaton Corporation, Cleveland, Ohio

[21] Appl. No.: 09/377,018

[22] Filed: Aug. 18, 1999

[51] Int. Cl.[7] .............................. H01H 1/00; H02B 1/04; H01R 4/28

[52] U.S. Cl. .......................... 200/305; 361/634; 439/810; 439/814; 335/202

[58] Field of Search ............................ 200/284, 293–296, 200/303–305, 400, 401, 500, 501; 218/1, 22, 30–33, 146, 155; 361/87, 93, 94, 600, 602, 611, 622–625, 627–629, 631–632, 634, 637, 639, 640, 641, 643, 644, 647, 648, 652, 656, 673, 823, 824, 827; 439/620–622, 715, 716, 723, 724, 769, 776–789, 801–815; 335/202

[56] References Cited

U.S. PATENT DOCUMENTS

| | | | |
|---|---|---|---|
| 3,748,420 | 7/1973 | Rexroad | 200/168 R |
| 5,005,104 | 4/1991 | Grunert | 361/355 |
| 5,107,396 | 4/1992 | Rosen et al. | 361/355 |
| 5,150,091 | 9/1992 | Hart et al. | 335/202 |
| 5,206,789 | 4/1993 | Barbry | 361/355 |
| 5,493,092 | 2/1996 | Rowe | 218/156 |
| 5,910,760 | 6/1999 | Malingowski | 335/167 |
| 5,978,208 | 11/1999 | Helms et al. | 361/634 |

*Primary Examiner*—Michael Friedhofer
*Attorney, Agent, or Firm*—Martin J. Moran

[57] ABSTRACT

A molded case circuit breaker having separable main contacts and an operating mechanism utilized to cause the separable main contacts to open and close. A trip unit is provided to actuate the operating mechanism in desirable circumstances. The circuit breaker has external terminals which are connectable with an external load and an external power supply. A collar is used to interconnect the circuit breaker terminals with the load and power supply. The terminal collar in this case is non-symmetrical. The non-symmetrical collar provides two functions: the first function is that the path of electrical continently between adjacent collars is enlarged for higher voltage applications because of the non-symmetrical nature of each collar; secondly, the circuit breaker case has a seat therein which has the same cross-section as the non-symmetrical collar, so that the collar can only be inserted therein in one cross-sectional orientation.

10 Claims, 7 Drawing Sheets

10

CIRCUIT INTERRUPTER WITH NON-SYMMETRICAL TERMINAL COLLAR

CROSS REFERENCE TO RELATED APPLICATIONS

The subject matter of this invention is related to concurrently filed, co-pending applications: U.S. patent application Ser. No. 09/377,001, Eaton Docket No. 97-PDC-505, filed Aug. 18, 1999, entitled "Circuit Breaker With Easily Installed Removable Trip Unit"; U.S. patent application Ser. No. 09/377,013, Eaton Docket No. 99-PDC-153, filed Aug. 18, 1999, entitled "Circuit Breaker With Externally Lockable Secondary Cover Latch"; U.S. patent application Ser. No. 09/376,897, Eaton Docket No. 99-PDC-220, filed Aug. 18, 1999, entitled "Circuit Breaker With Lockable Trip Unit Adjustment Cover"; U.S. patent application Ser. No. 09/376,920, Eaton Docket No. 99-PDC-221, filed Aug. 18, 1999, entitled "Circuit Breaker With Combined Slot Motor, Reverse Loop And Terminal Strap"; U.S. patent application Ser. No. 09/376,248, Eaton Docket No. 99-PDC-222, filed Aug. 18, 1999, entitled "Circuit Breaker With Combination Push-To-Trip And Secondary Cover Latch"; U.S. patent application Ser. No. 09/376,265, Eaton Docket No. 99-PDC-223 filed Aug. 18, 1999, entitled "Multi-Pole Circuit Breaker With Multiple Trip Bars"; U.S. patent application Ser. No. 09/376,816, Eaton Docket No. 99-PDC-225, filed Aug. 18, 1999, entitled "Circuit Breaker With Trip Unit Mounted Tripping Plunger And Latch Therefore", issued U.S. patent application Ser. No. 09/376,815, Eaton Docket No. 99-PDC-246, filed Aug. 18, 1999, entitled "Circuit Breaker With Side Wall Opening For A Separate Auxiliary Device Actuation Lever", and U.S. patent application Ser. No. 09/376,254, Eaton Docket No. 99-PDC-247, filed Aug. 18, 1999, entitled "Circuit Breaker With Dial Indicator For Magnetic Trip Level Adjustment".

BACKGROUND OF THE INVENTION

1. Field of the Invention

The subject matter of this invention is related generally to molded case circuit breakers and more specifically to terminal collars for molded case circuit breakers.

2. Description of the Prior Art

Molded case circuit breakers are well known in the ar t as exemplified by U.S. Pat. No. 5,910,760 issued Jun. 8, 1999 to Malingowski et al., entitled "Circuit Breaker with Double Rate Spring" and assigned to the assignee of the present application. The foregoing is incorporated herein by reference.

Molded case circuit breakers include a set of separable main contacts, one of which is usually fixed and one of which is movable for automatically opening upon the occurrence of an overload or short circuit electrical current in the network which the circuit breaker is provide to protect. The separable main contacts are opened as a result of the functioning of a latched operating mechanism, which is interconnectable by way of an operating handle to a region outside of the circuit breaker. The operating handle may be used to trip the circuit breaker manually or to reset and close the circuit breaker contacts once they have been opened automatically. The reset action is required because circuit breakers must be mechanically charged to be in a state to reopen immediately upon closure in the event that the fault which cause the tripping in the first place has not disappeared. The reset action charges the circuit breaker for that purpose. Molded case circuit breakers have trip units, which are often removably insertable in the circuit breaker case.

The trip unit in addition has at least two calibratable functions, one of which is generally identified as thermal tripping and the other of which is generally identified as magnetic tripping. The trip unit includes a rotatable trip bar, which when rotated will actuate a latchable tripping operation within the operating mechanism to automatically open the circuit breaker contacts. The rotatable trip bar is usually actuated in one of two ways. The first way is in response to what is called a magnetic tripping of the circuit breaker. This occurs when the amount of current flowing through the separable main contacts of the circuit breaker is so high as to represent a potential catastrophic failure and which therefore requires exceedingly quick opening action of the circuit breaker. In such a case a electron magnetic core, which produces magnetic flux in proportion to the amount of electrical current flowing through the separable main contacts attracts a movable armature, the movement of which eventually causes the trip bar to move to thus cause the tripping action. The second tripping occurrence is in response to a relatively low amount of overload current, which eventually will cause overheating of the electrical wires in the circuit to be protected, but which does not necessitate the instantaneous action a short circuit requires and thus does not require the magnetic action spoken of previously. In this case a bi-metal element is heated by a heater element which conducts the electrical current flowing through the separable main contacts. As the bi-metal element flexes or moves it impinges upon the tripping bar causing it to flex and move correspondingly, until eventually a point is reached in which the tripping bar causes the circuit breaker to unlatch and trip automatically. Both the magnetic trip mechanism and the thermal trip mechanism usually require initial calibration.

In one half of an AC cycle, the electrical current flows through the circuit interrupter from the load by way of a terminal collar to the load terminal of the circuit breaker and from there into the trip unit where it flows through the previously mentioned heater which in turn is serially connected to the electron magnetic member of the magnetic trip device. From there it is interconnected by way of a flexible cable to one end of a moveable contact arm and from there to the main contact on the moveable contact arm. When the contact arm is closed, it is closed upon a fixed contact which is supported usually on u-shaped conductor, which in turn is interconnected with a line terminal and there to the line terminal collar and finally to the electrical line. In addition the circuit breaker usually has an arc chute for assisting in diminishing the electrical arc drawn between the separating contacts during the opening operation for extinguishing of the arc. The circuit breaker also has a slot motor arrangement, which is utilized to interact magnetically with the electrical current flowing in the opening contact arm to accelerate the opening of the contact arm magnetically. The operating mechanism usually consists of a series of levers and linkages, which are interconnected with the separable main moveable contact arm, the handle mechanism, and by way of a latch arrangement with the aforementioned trip bar. Description and operation of all of the above may be found in the previous mentioned, incorporated by reference '760 patent.

Molded case circuit breakers usually have collars which interface the line and load terminals of the circuit breaker with electrical cables. Such a collar may be found in U.S. Pat. No. 5,206,789 issued Apr. 27, 1993 to Barbry et al., entitled "Terminal Assembly for a Circuit Breaker and Similar Apparatus" and assigned to the assignee of the present application. Other examples of such arrangements may be found in U.S. Pat. No. 5,005,104. In the past these collars have been basically symmetrical in nature. That it is, the functions, equally well in a number of orientations. It would be advantageous, however, if a collar could be found which had the same interconnection and electrical isolation facility as the previous collars, but which could be reduced in size to thus allow the size of the overall breaker to be reduced. It would be further advantageous if the circuit breaker casing was adapted to having this collar integrated into it.

SUMMARY OF THE INVENTION

In accordance with the invention there is provided a circuit interrupter having a housing. There is an operating mechanism disposed within the housing. Also, separable contacts are disposed within the housing in cooperation with the operating mechanism for being opened by the operating mechanism, a terminal is interconnected with the separable contacts for providing an electrical conduction path from a region outside of the housing to the separable contacts. The terminal has a non-symmetrically shaped terminal collar connected thereto with a region of relatively smaller dimension relative to a region of relatively larger dimension, the closest uninsulated path between the non-symmetrically shaped terminal collar and the nearest external portion of the housing being from the region of relatively smaller dimension.

BRIEF DESCRIPTION OF THE DRAWINGS

In accordance with the invention, reference may be had to the preferred embodiment thereof, shown in the accompanying drawings in which.

DESCRIPTION OF THE PREFERRED EMBODIMENT

Figure 1:
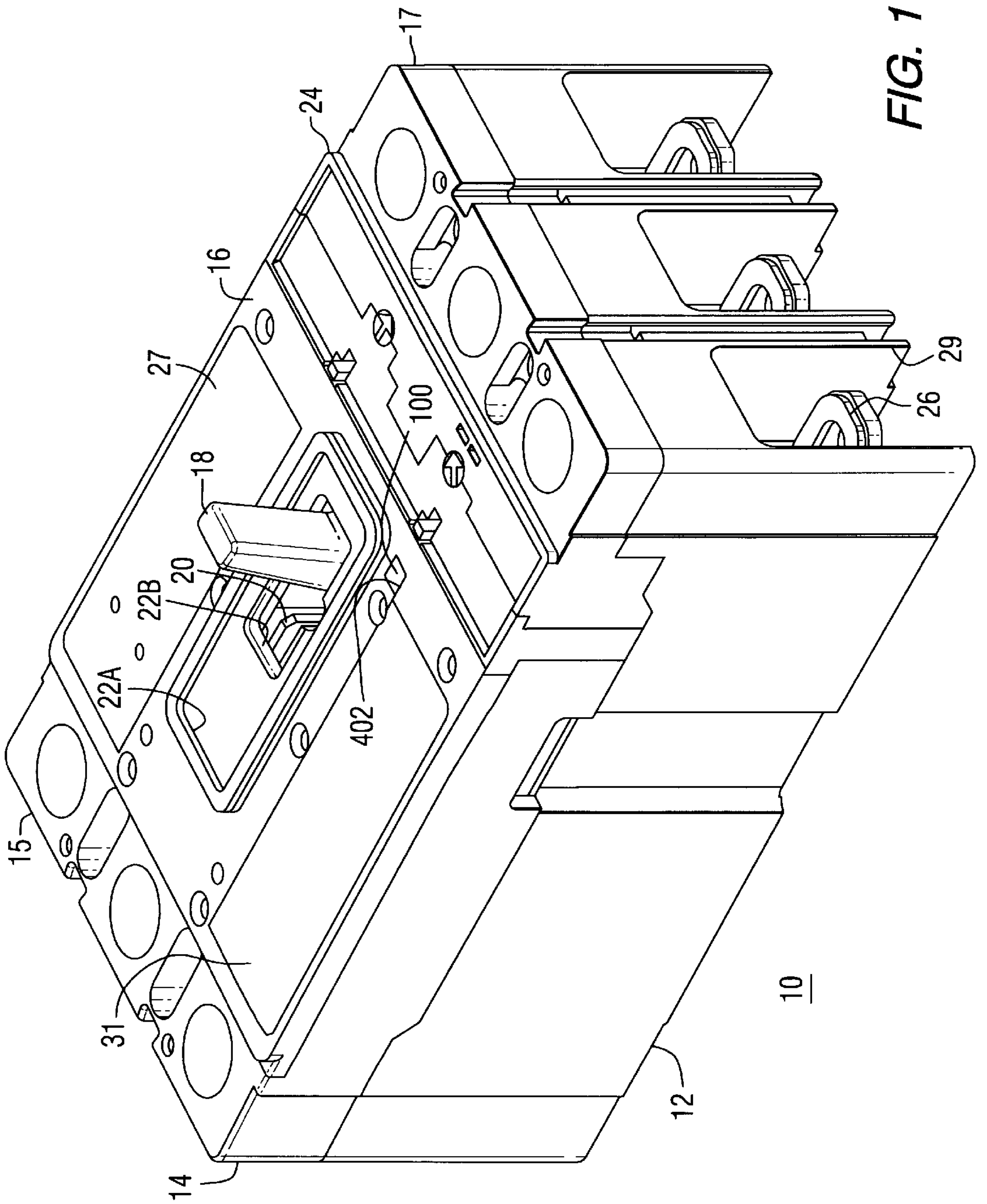
FIG. 1 is an orthogonal view of a three-phase molded case circuit breaker employing embodiments of the present invention.

Referring now to the drawings and FIGS. 1 through 4 in particular, there is shown a molded case circuit breaker or interrupter 10 having a main base 12 and primary cover 14. Attached to the primary cover 14 is a secondary cover 16. A handle 18 extends through a secondary escutcheon 22A in the secondary cover 16 and aligned primary escutcheon 22B in the primary cover 14. An operating mechanism 20 is interconnected with the handle 18 for opening and closing separable main contacts in a manner which will be described hereinafter. This circuit breaker has a line end 15 and load end 17. The circuit breaker or interrupter includes a removable trip unit 24. Removable trip unit 24 has an underlapping lip 24X, the purpose of which will be described hereinafter. There are also depicted a load terminal 26, a right side accessory region or pocket 27 and a left side accessory pocket or region 31.

Figure 2:
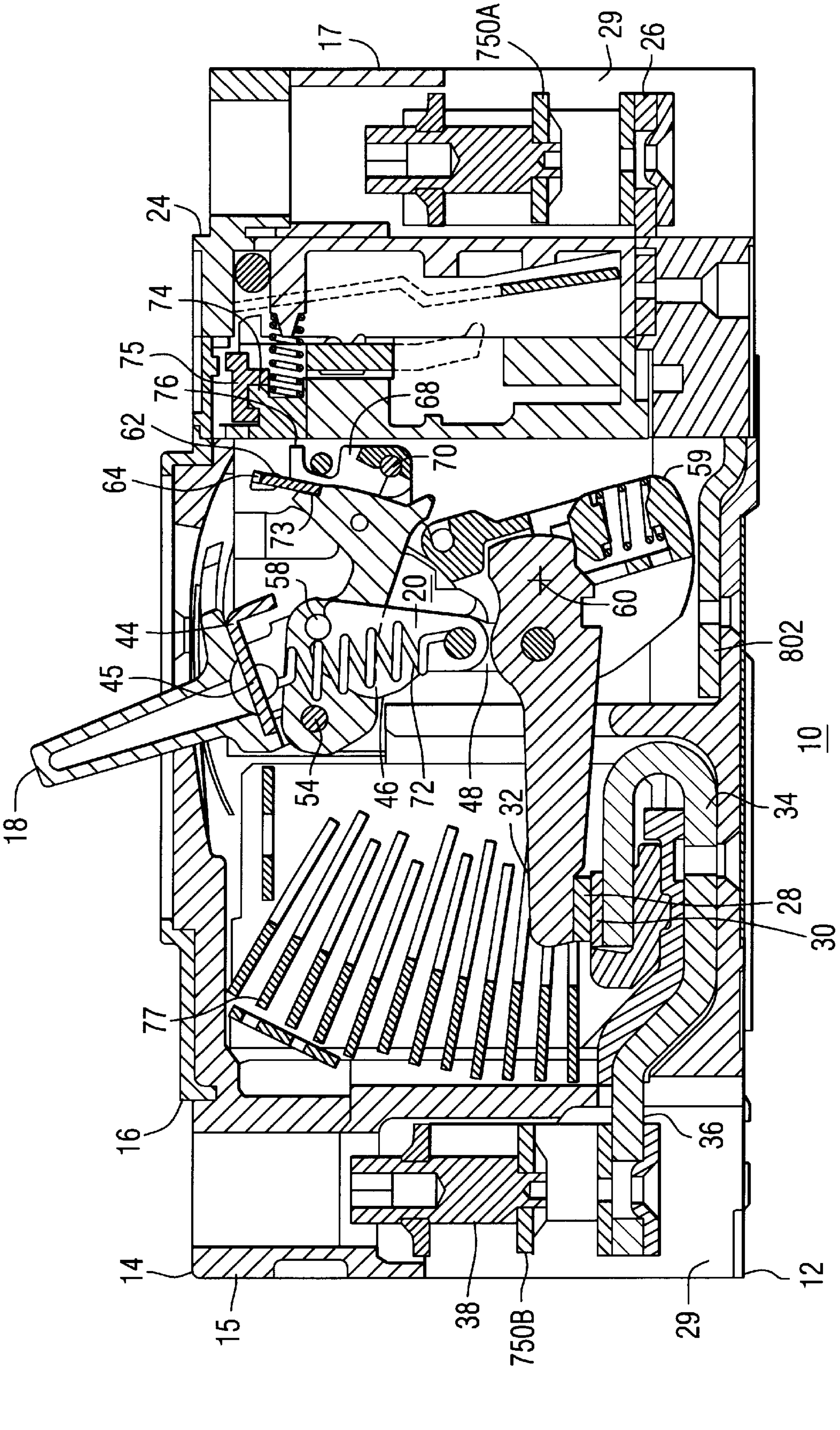
FIG. 2 is a cut away side elevation section of the circuit breaker of FIG. 1, depicting the circuit interrupter in the closed state.
Figure 3:
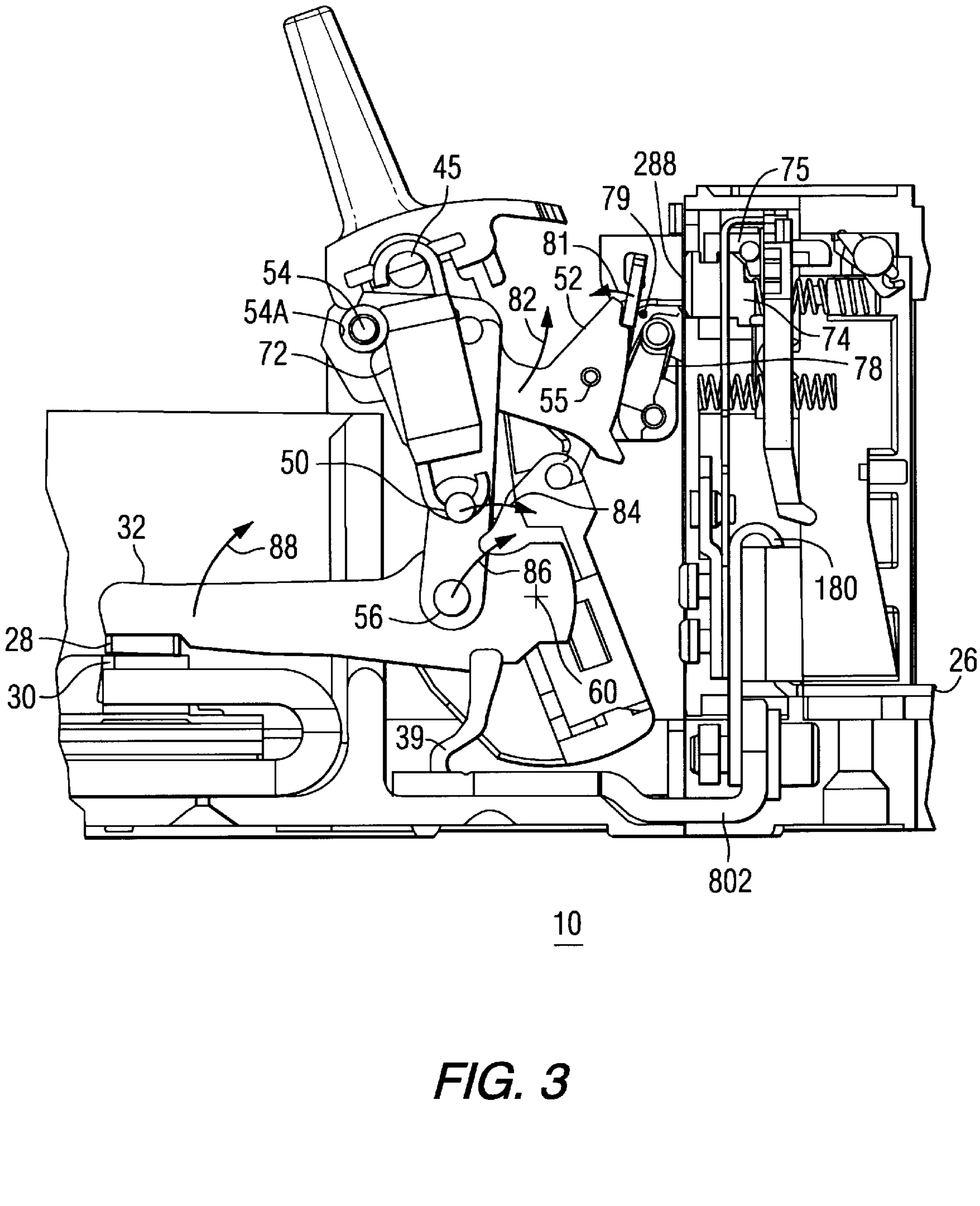
FIG. 3 is a side elevation view similar to that shown in FIG. 2, concentrating on the circuit breaker operating mechanism and trip unit.
Figure 4:
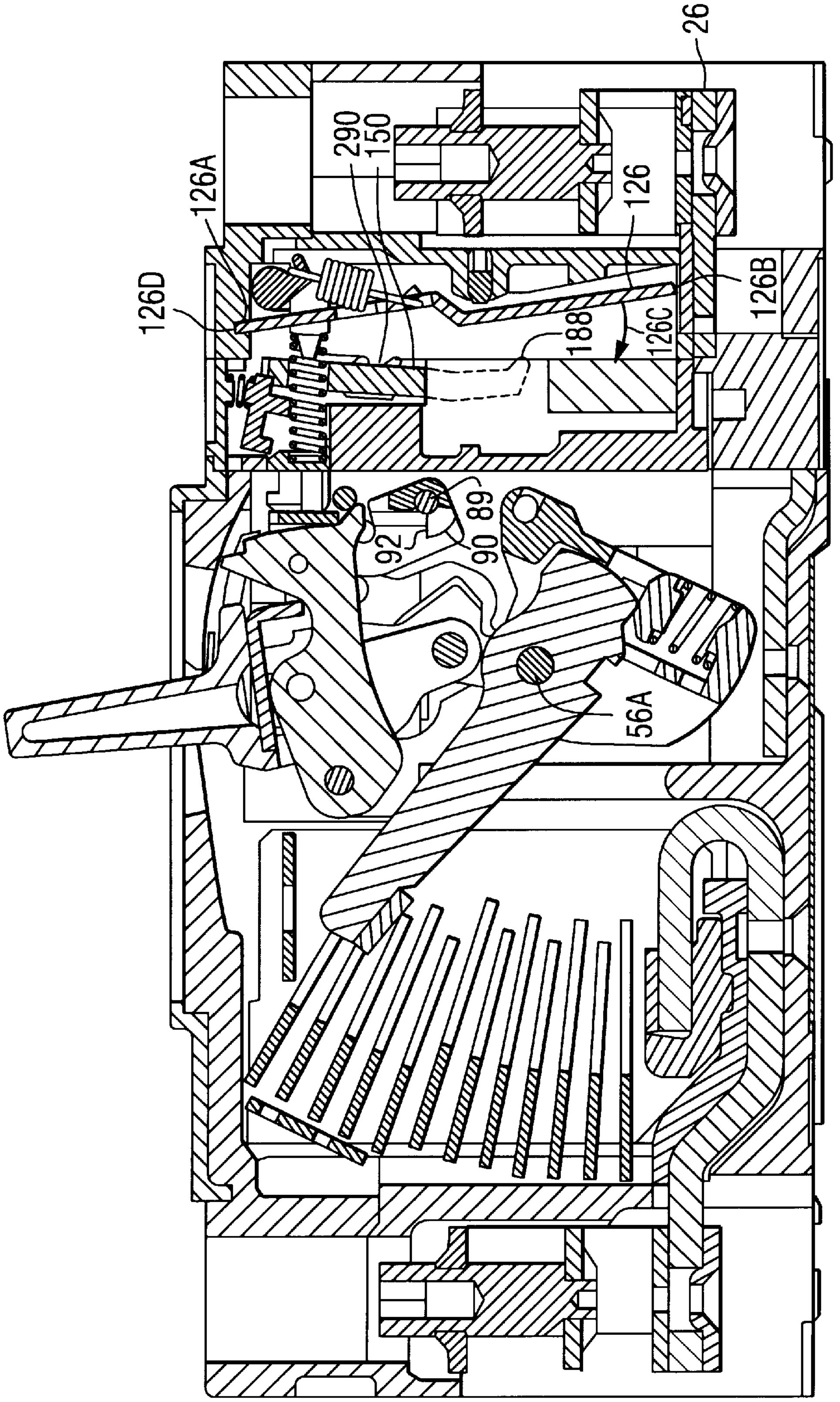
FIG. 4 is similar to FIG. 2, but depicts the circuit interrupter in the tripped state.

Referring now more specifically to FIGS. 2, 3 and 4, there are depicted a separable movable contact 28 disposed upon a moveable contact arm 32 and a fixed contact 30 disposed upon a fixed contact support or u-shaped member 34. Line terminal 36 is disposed to the left in FIG. 2, for example, at the line end 15 of the circuit interrupter in a terminal cave or pocket 29. A load terminal 26 is disposed to the right in FIG. 2, for example, in a load terminal cave or pocket 29. To the left on the line terminal 36 is disposed a line terminal collar 38 which will be described in more detail hereinafter, and to the right is provided a load terminal jumper-tomovable contact arm conductor 802. Connected to conductor 802 is a flexible conductor 39, which is interconnected with movable contact arm 32 as shown schematically. The load terminal jumper or frame conductor 802 is interconnected at its other end with a bi-metal heater 180, which in turn is interconnected at its other end with the terminal 26. Consequently, when the circuit interrupter separable main contacts 28 and 30 are closed upon each other, there is a complete circuit through the circuit interrupter from right to left starting with line conductor 26 through bi-metal heater 180, through load terminal jumper or frame conductor 802, through flexible conductor 39, through the movable contact arm 32, through contact 28 to contact 30 and from there through the fixed contact support or u-shaped member 34 to line terminal 36.

There is provided a operating mechanism 20 for assisting in opening and closing the separable main contacts 28 and 30. In particular, the operating mechanism includes a cradle 52, which is pivoted on one end at a cradle fixed pivoted pin 54 by way of an opening 54A in the cradle for placement of the cradle fixed pivoted pin therein. The cradle includes a cradle-to-side accessory region side protrusion 55. There is provided an upper toggle link 46 and a lower toggle link 48. They are joined pivotally by an upper and lower toggle link pin 50. There is provided a lower toggle link to movable contact arm main pivot assemble attachment pin 56, which is affixed to the movable contact arm 32 at an opening 56A. There is also a cradle to upper toggle link pivot pin 58, by which the upper toggle link 46 is placed in physical contact with the cradle 52. There is also provided a movable contact arm main pivot assembly 59, which movably, rotatably pivots on a pivot 60. There is also provided a primary frame latch 62 which operates or rotates on a primary frame latch pivot 64. The primary frame latch 62 cooperates with a secondary frame latch 68, which rotates on a secondary frame latch pivot 70. The operating power for the tripping operating of the circuit breaker is provided by a charged main toggle coil spring 72. The main toggle coil spring is interconnected with a handle yoke 44 by way of a handle yoke attachment post 45. The other end of the spring 72 is attached to the toggle link pin 50. Cradle 52 has a cradle lip 73, which is captured or held in place by the primary latch 62 when the separable main contacts 28 and 30 are closed. No tripping of the circuit breaker can take place by way of the operating mechanism until the aforementioned primary frame latch 62 has been actuated away from the cradle lip 73 in a manner which will be described hereinafter. There is provided a combination secondary-frame-latch-primary-frame-latch torsion spring 78, which exerts force against both latches sufficient to cause appropriate movement thereof at the appropriate time. The secondary frame latch has a laterally extending trip protrusion 79, the purpose of which will be described later hereinafter. Actuation of the primary and secondary frame latches occurs exclusively by way of the utilization of a resetable trip unit trip plunger 74, which is contained entirely within the removable trip unit 24. The trip unit trip plunger 74 is controlled or latched by way of a plunger latch or interference latch 75. The secondary frame latch 68 is in disposition to be struck by the moving trip unit plunger abutment surface 288. Upon opening of the separable main contacts 30 and 28, an electric arc is drawn therebetween which is exposed to an arc chute 77. The secondary frame latch 68 has a bottom portion 89, upon which is disposed an arcuate stop surface 90 for the primary frame latch 62. There is also provided above that arcuate stop surface and as part of the acruate stop member a latch surface 92.

The operating mechanism described herein may be the same as found in U.S. Pat. No. 5,910,760 issued Jun. 8, 1999 to Malingowski et al., entitled "Circuit Breaker with Double Rate Spring". Thought the primary and secondary frame latches are disposed within the case 12, the trip unit plunger 75 is responsible for initiating all tripping action from the trip unit 24 into the region of the secondary latch 68. Alternatively, the secondary latch 68 may be actuated by a push-to-trip button in a manner, which will be described hereinafter. The secondary latch 68 is actuated to rotate to the left as shown in FIGS. 2, 3 and 4, for example, in direction 81 about its pivot 70. As this occurs the acruate stop surface 90 for the secondary frame latch 68 rotates away from the bottom of the primary frame latch 62 until the lateral latch surface 92 rotates into a disposition to allow the bottom of the primary frame latch 62 to rotate to the right under the force of the cradle 72. This causes the primary frame latch 62 to clear the lip 73 of the cradle 52 to allow the cradle 52 to rotate upwardly about its pivot 54 in a direction 82 under the power of the now collapsing coil spring 72 by way of the force exerted thereupon by the upper toggle link 46 acting against the cradle-to-upper-toggle link connecting pin 58. As the toggle spring 72 relaxes, the upper and lower toggle links collapse, which in turn causes the lower toggle link to movable contact arm pivot assembly 56 to rotate upwardly in the direction 86 about its pivot 60. This, of course, causes the contact arm 32 to rotate similarly in the direction 88, thus opening the separable main contacts 28 and 30 and in most cases establishing an electrical arc of conducting electrical current there across. The action of the secondary frame latch 68 can be duplicated by causing secondary latch push-to-trip member side laterally extending trip protrusion 79 to rotate in the direction 81 by operation of a push-to-trip member which will be described later hereinafter. Resetting of the circuit breaker is accomplished in a matter well known in the prior art and described and shown with respect to the aforementioned U.S. Pat. No. 5,910,760. The important part of the operation with respect to this feature is the movement of the secondary frame latch point 76 in the direction opposite to direction 82, against the plunger face 288 in a manner, which will be described later hereinafter. However, if movement of the plunger face 288 in the rightward direction against its plunger spring, as will be described hereinafter, is prevented because of the latching of the plunger member 74, in a manner which will be described hereinafter, then the circuit breaker can not be reset. An important feature of the invention lies in the fact that the ultimate control of the resetting of the circuit breaker and tripping of the circuit breaker can be accomplished only from the removable trip unit 24, rather than from the operating mechanism 20.

Figure 5:
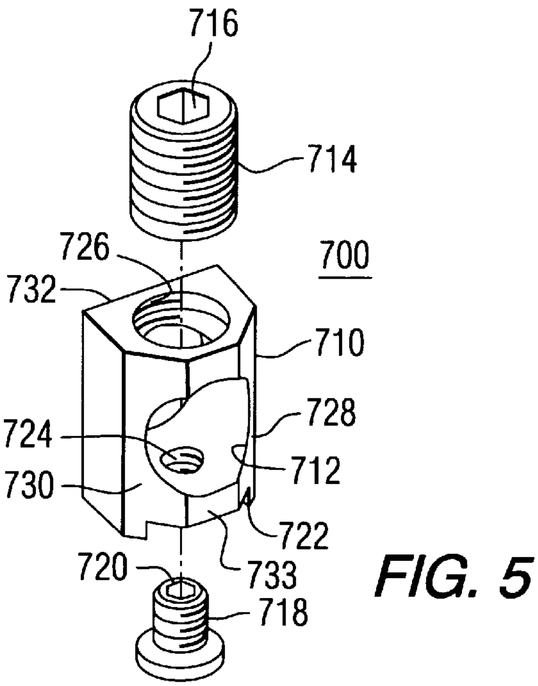
FIG. 5 shows an orthogonal view in exploded form of an aluminum line or load collar.

An embodiment of the invention is shown in FIGS. 5 through 11. In particular there is shown in FIG. 5 a non-symmetrical aluminum terminal collar 700. The aluminum terminal collar 700 has a main body 710 with a transverse cable opening 712. There is provided a cable compression fastener 714, which has threads and which may be threaded downwardly into a similarly threaded hole 726 to abut any cables (not shown) which have been transversely fed through the hole or opening 712. An appropriate drive opening 716 is provided in the member 714 for screwing it down into the hole 716. There is provided a threaded hole 724 in the bottom of the main body 710 of the terminal 700 into which a threaded a line terminal securement nut 718 may be upwardly threaded therein, through a portion of the circuit breaker case (not shown). There is provided a lateral terminal cut-out 722 on the bottom of the terminal main body 710 for alignment with line conductor, such as will be described hereinafter. The terminal securement nut 718 may be driven or threaded into hole 724 by way of suitable through drive hole 720. The main body 710 has a pair of main body beveled surfaces on the right and left at 728 and 730, respectively. There is also a rear transverse main body surface at 732 and a front parallel transverse main body surface 733, which abuts and is between the beveled regions 728 and 730.

Figure 6:
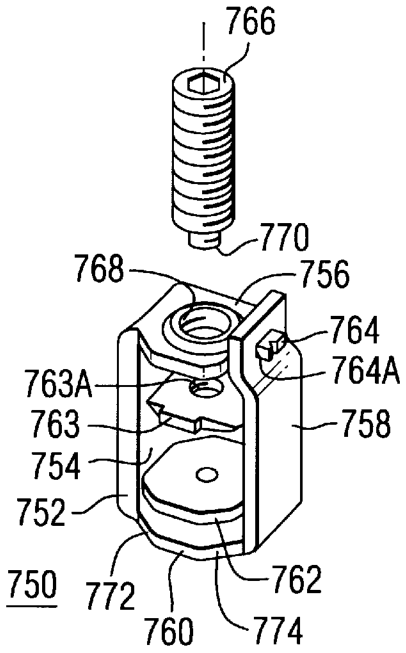
FIG. 6 shows an arrangement similar to that shown in FIG. 5 for a steel line or load collar.

Referring to FIG. 6, a non-symmetrical steel terminal collar 750 embodiment of the invention is depicted. There is a main body 752 of the steel terminal collar 750, having a first side 754, a top 756, a second and parallel side to the first side 758 and bottom 760. There is a lower movable cable compression plate 762, which is disposed within the perimeter of the aforementioned sides, top and bottom and is movable up and down therein for compressing cables against an upper movable compression plate 763, which is oppositely disposed from the lower one. There is provided a locking tab 764, which fits into a hole or opening 764A in side 758 for completely securing the top 756 of collar to the side 758 of the collar. There is provided a threaded cable compression bolt 766, which may be driven downwardly through a complimentary threaded hole 768 in the top 756 of the main body 752. A threaded rider member 770 is disposed on the bottom thereof and it links up with a threaded hole or opening 763A in the movable upper cable rider member 763. There is provided on the left and right, beveled shoulders 772 and 774, respectively, which correspond to the beveled regions 730 and 728 respectively, for example, in the embodiment of FIG. 5. By referring to FIG. 2, it can be seen that the steel body terminal 750 may be utilized as a line terminal 750B and as a load terminal 750A.

Figure 7:
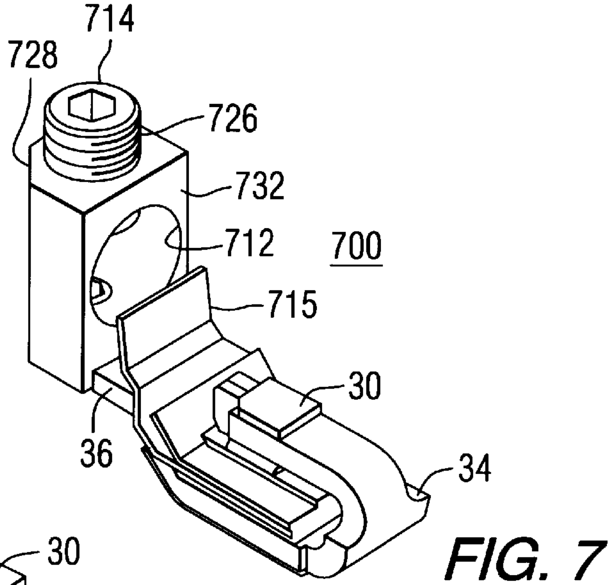
FIG. 7 shows an orthogonal view of the aluminum collar of FIG. 5 interconnected with the fixed contact arrangement of the circuit interrupter of FIG. 1.
Figure 8:
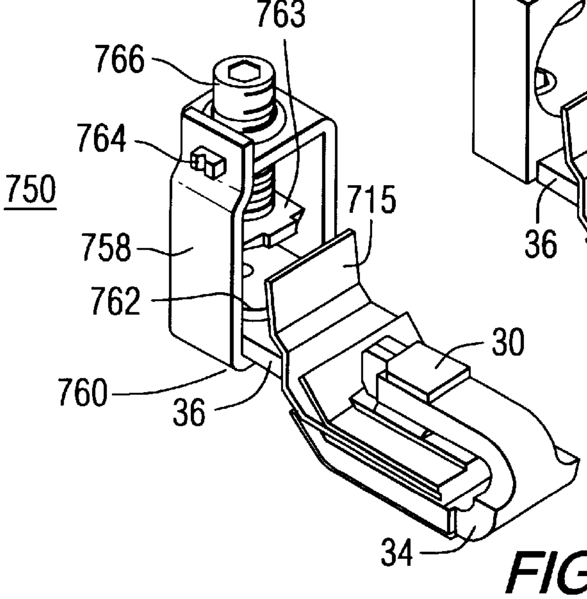
FIG. 8 shows an arrangement similar to that shown in FIG. 7 for the steel collar of FIG. 6.

FIGS. 7 and 8 show the disposition of the members 700 and 750 on terminals 36 of u-shape members 34 with the fixed contact 30. Insulation 715M disposed between the contact 30 and the terminal 36 in each case.

Figure 9:
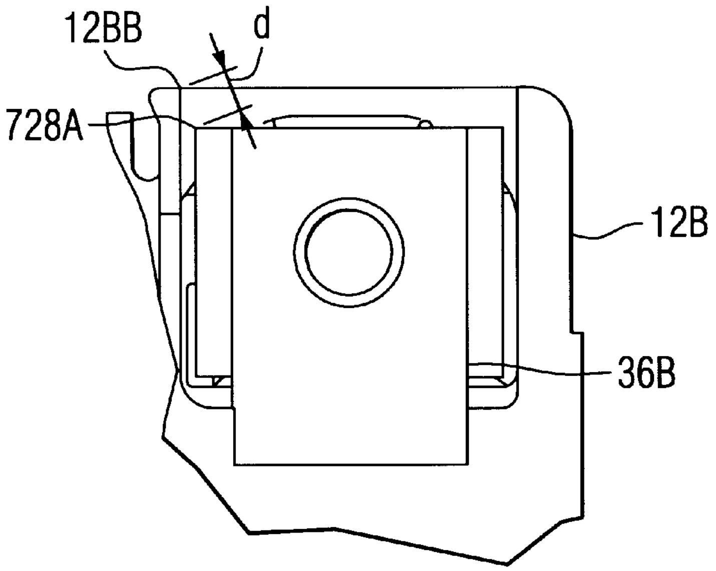
FIG. 9 PRIOR ART
FIG. 9 shows a prior art view in cross-section, partially broken away of the spacing between a prior art collar and a circuit breaker case edge.
Figure 10:
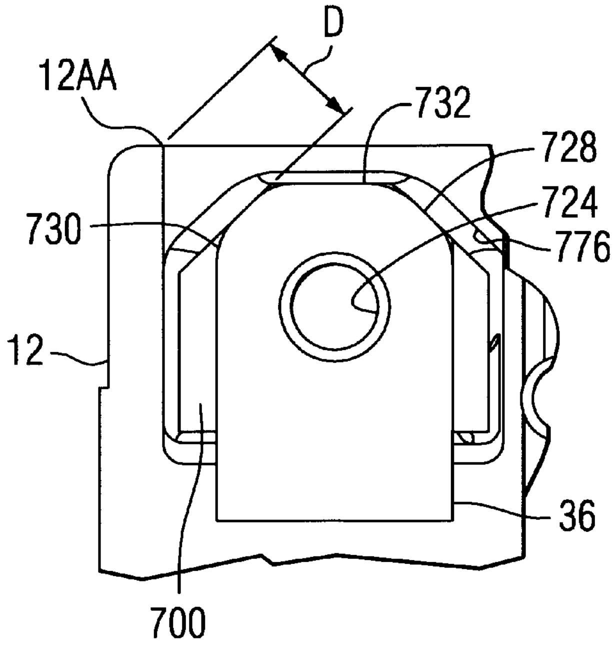
FIG. 10 shows an arrangement similar to that shown in FIG. 9 for the collar of the present invention.

Referring now to FIGS. 9 and 10, in FIG. 10, there is shown at 76 a complimentary pocket seat in the circuit breaker case 12 for seating either of the collar embodiments therein. Because the seat 776 is non-symmetrical having bevels on the front but not on the back, the terminals can only be seated therein in one direction or one orientation, which is a feature of the present invention. Another feature of the present invention lies in the enhanced voltage separation caused by the bevels or chamfers 728 and 730. FIG. 9 shows a prior art arrangement in which, prior art main body 728A is not beveled as in the present invention. The distance between the conductive corner 728A of the collar and the nearest point 12BB on the non-conductive casing 12B for the terminal arrangement 36B is represented by ‘d’. However in FIG. 10, it can easily be seen that the arrangement utilizing the member 700 for example, is such that the distance ‘D’ between the bevel 730 for example, and the nearest, closest corner 12AA is significantly larger than the distance ‘d’.

Figure 11:
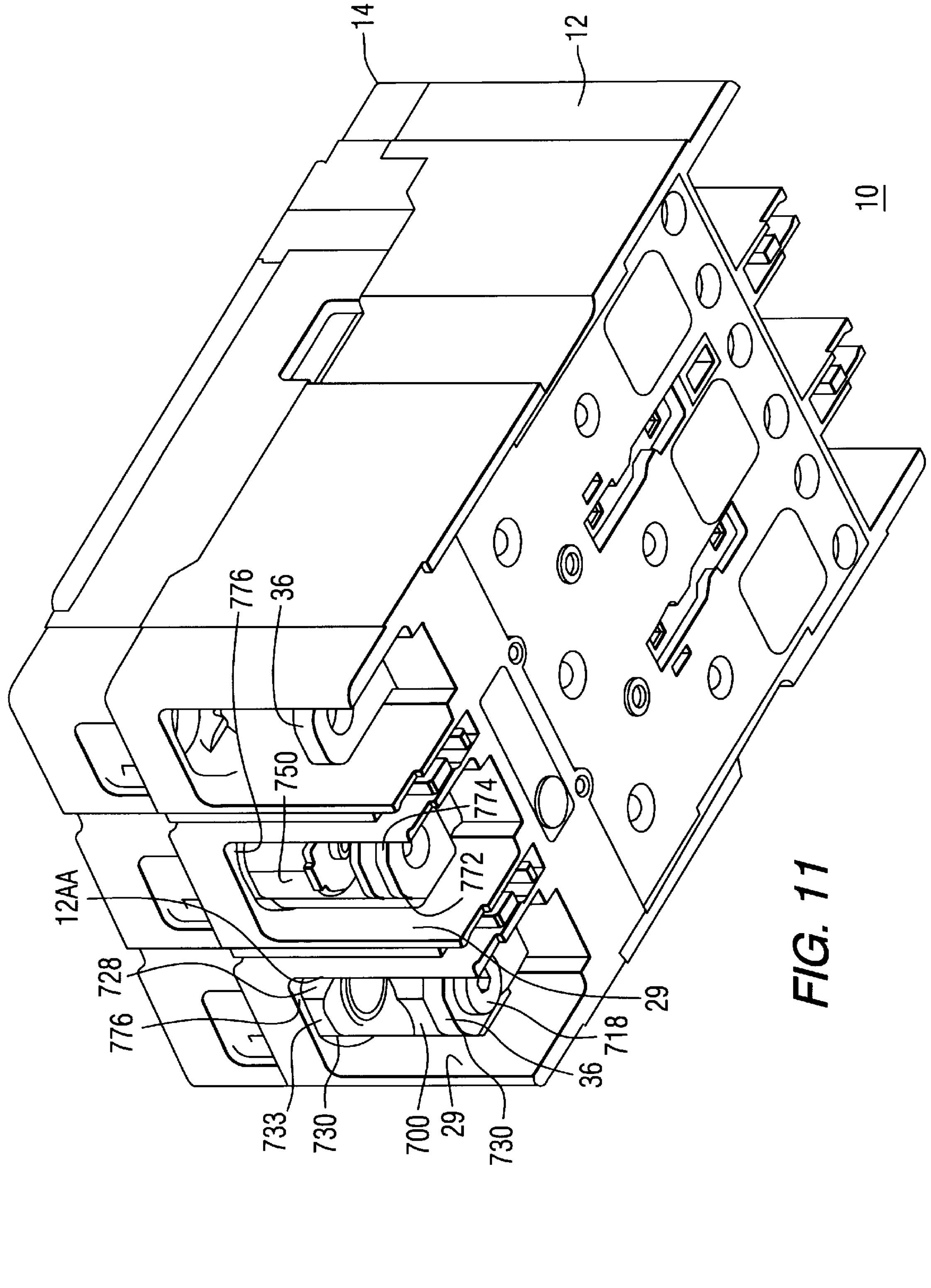
FIG. 11 shows a bottom view of the circuit interrupter apparatus of FIG. 1 in orthogonal view with the collars of FIGS. 5 through 8 disposed therein.

By referring to FIG. 11, it can be seen that the complimentary pocket seat 776 in the circuit breaker case only allows a seating of either of the terminal arrangements 700 or 750 in one orientation within the circuit breaker case 12. This is another feature of the invention.

What we claim as our invention is:

1. A multi pole circuit interrupter device, comprising:

a housing;

operating mechanism means disposed within said housing;

multi pole separable contact means disposed within said housing in cooperation with said operating mechanism means for being opened by said operating mechanism means;

opening means disposed within said housing in cooperation with said operating mechanism means for actuating said operating mechanism means for opening said separable contact means; and multi pole terminal means interconnected with said multi pole separable contact means for providing an electrical conduction path from a region outside of said housing to each pole of said multi pole separable contact means, each terminal of said multi pole terminal means having a non-symmetrically shaped terminal collar means connected thereto with a region of relatively smaller dimension relative to a region of larger dimension, uninsulated lateral paths of electrical conduction between adjacent pairs of said terminal collar means, the shortest uninsulated lateral electrical conduction path between an adjacent pair of said non-symmetrically shaped terminal collar means being between said regions of relatively smaller dimensions.

2. The combination as claimed in claim 1, wherein said housing has adjacent terminal pockets in which each of said non-symmetrically shaped terminal collar means is disposed.

3. The combination as claimed in claim 2, wherein each of said adjacent terminal pockets has a seat in which each of said non-symmetrically shaped terminal collar means is captured.

4. The combination as claimed in claim 1, wherein each said non-symmetrically shaped terminal collar means has a chamfer defining said regions of relatively smaller dimension.

5. The combination as claimed in claim 1, wherein said non-symmetrically shaped terminal collar means is non-symmetrically shaped in cross section.

6. The combination as claimed in claim 5, wherein each of said non-symmetrically shaped terminal collar means has a chamfer defining said regions of relatively smaller dimension.

7. The combination as claimed in claim 6, wherein each of said adjacent terminal pockets has a seat in which each of said non-symmetrically shaped terminal collar means is captured.

8. The combination as claimed in claim 7, wherein each said seat has the same cross section as said non-symmetrically shaped chamfered terminal collar means seated therein.

9. A circuit interrupter device, comprising:

a housing;

operating mechanism means disposed within said housing;

separable contact means disposed within said housing in cooperation with said operating mechanism means for being opened by said operating mechanism means;

opening means disposed within said housing in cooperation with said operating mechanism means for actuating said operating mechanism means for opening said separable contact means;

terminal means interconnected with said separable contact means for providing an electrical conduction path from a region outside of said housing to said separable contact means, said terminal means having a terminal, said terminal of said terminal means having a non-symmetrically shaped terminal collar means connected thereto with a region of relatively smaller dimension relative to a region of larger dimension;

wherein said housing has a terminal pocket in which said non-symmetrically shaped terminal collar means is disposed; and wherein said pocket has a seat in which said non-symmetrically shaped terminal collar means is captured.

10. The combination as claimed in claim 9, wherein said non-symmetrically shaped terminal collar means has a chamfer defining said region of relatively smaller dimension.

* * * * *